US009976526B2

(12) United States Patent
Caley et al.

(10) Patent No.: US 9,976,526 B2
(45) Date of Patent: May 22, 2018

(54) GASEOUS METERING CONTROL FOR DUAL FLUID INJECTOR

(75) Inventors: David James Caley, City Beach (AU); Thomas Gerlach, Karrinyup (AU); Simon Christopher Brewster, Shipston on Stour (GB)

(73) Assignee: ORBITAL AUSTRALIA PTY LTD, Balcatta (AU)

( * ) Notice: Subject to any disclaimer, the term of this patent is extended or adjusted under 35 U.S.C. 154(b) by 582 days.

(21) Appl. No.: 14/126,048

(22) PCT Filed: Jun. 29, 2012

(86) PCT No.: PCT/AU2012/000773
§ 371 (c)(1),
(2), (4) Date: Apr. 15, 2014

(87) PCT Pub. No.: WO2013/003888
PCT Pub. Date: Jan. 10, 2013

(65) Prior Publication Data
US 2014/0246508 A1    Sep. 4, 2014

(30) Foreign Application Priority Data

Jul. 4, 2011 (AU) ................................ 2011902649

(51) Int. Cl.
*F02M 43/04* (2006.01)
*F02M 69/52* (2006.01)
(Continued)

(52) U.S. Cl.
CPC ........... *F02M 43/04* (2013.01); *F02D 19/061* (2013.01); *F02D 19/0628* (2013.01);
(Continued)

(58) Field of Classification Search
CPC .... F02M 43/04; F02M 69/52; F02D 19/0628; F02D 19/081; F02D 19/0694;
(Continued)

(56) References Cited

U.S. PATENT DOCUMENTS 5,228,423 A * 7/1993 Oikawa .................... F01L 1/267
                                                                123/432
5,365,902 A * 11/1994 Hsu ........................... F02B 7/02
                                                                123/299

(Continued)

FOREIGN PATENT DOCUMENTS

EP        1 496 247 A1    1/2005
WO   WO-2010/089568 A1    8/2010

OTHER PUBLICATIONS

International Search Report and Written Opinion for PCT/AU2012/000773, dated Sep. 3, 2012; ISA/AU.

(Continued)

Primary Examiner — Joseph Dallo
(74) Attorney, Agent, or Firm — Harness, Dickey & Pierce, P.L.C.

(57) ABSTRACT

A fuel injection system (10) for delivering metered amounts fuel into the combustion chamber or cylinder of an engine. The fuel delivered can selectively comprise a gaseous fuel, a liquid fuel or a fuel mixture comprising the gaseous fuel and the liquid fuel. When the fuel delivered comprises a mixture of the gaseous fuel and the liquid fuel, the quantity of liquid fuel comprises a metered quantity. The quantity of gaseous fuel also comprises a metered quantity, with the metering of the gaseous fuel being regulated by prediction. The injection event involves delivering the liquid fuel and the gaseous fuel, with the metering of the gaseous fuel delivered being adjusted to allow for the quantity of liquid fuel delivered with the gaseous fuel. The injection system (10) comprises a liquid fuel circuit (11) and a gaseous fuel (Continued)

circuit (13), both communicating with a fuel delivery injector (15) that delivers fuel to the combustion chamber. The fuel injection system (10) further comprises an electronic control unit (ECU) for controlling operation of the fuel injection system (10). The ECU controls operation of the fuel delivery injector (15) and a fluid metering injector (31). The ECU determines the proportions of liquid fuel and gaseous fuel required to meet the fuelling demand. The ECU operates the fluid metering injector (31) to deliver the required quantity of liquid fuel into a holding chamber within the fuel delivery injector (15). The ECU also predicts the gaseous fuel flow required to deliver the necessary proportion of gaseous fuel and operates the fuel delivery injector (15) accordingly. In particular, the ECU refers to a "look-up" map or table to determine the operating parameters of the fuel delivery injector (15) to deliver the necessary quantity of gaseous fuel in conjunction with the metered quantity of liquid fuel.

27 Claims, 6 Drawing Sheets

(51) Int. Cl.
F02D 19/06 (2006.01)
F02D 19/08 (2006.01)
F02D 41/00 (2006.01)

(52) U.S. Cl.
CPC ..... F02D 19/0644 (2013.01); F02D 19/0647 (2013.01); F02D 19/0694 (2013.01); F02D 19/081 (2013.01); F02D 41/0027 (2013.01); F02M 69/52 (2013.01); Y02T 10/36 (2013.01)

(58) Field of Classification Search
CPC ............... F02D 19/061; F02D 41/0027; F02D 19/0647; F02D 19/0644; Y02T 10/36
USPC ........... 123/445, 27 GE, 525, 472, 575, 1 A; 701/104
See application file for complete search history.

(56) References Cited

U.S. PATENT DOCUMENTS

| | | | | |
|---|---|---|---|---|
| 5,592,924 A * | 1/1997 | Audisio | ................. | F02B 69/04 123/525 |
| 5,996,558 A * | 12/1999 | Ouellette | ................ | F02D 19/10 123/27 GE |
| 6,336,598 B1 * | 1/2002 | Touchette | ............... | F02D 19/10 239/408 |
| 6,427,660 B1 | 8/2002 | Yang | | |
| 6,947,830 B1 * | 9/2005 | Froloff | .................. | F02D 35/023 701/111 |
| 7,019,626 B1 * | 3/2006 | Funk | ................... | F02D 19/0647 123/205 |
| 7,047,909 B1 * | 5/2006 | Botti | ....................... | C01B 3/386 123/1 A |
| 7,089,916 B2 * | 8/2006 | Abo | ....................... | F02B 23/104 123/299 |
| 7,171,924 B2 * | 2/2007 | Robel | ..................... | F02D 19/12 123/26 |
| 7,188,587 B1 * | 3/2007 | Quader | ................. | B60W 10/06 123/26 |
| 7,353,800 B2 * | 4/2008 | Gibson | .............. | F02M 63/0225 123/304 |
| 7,392,791 B2 * | 7/2008 | Gibson | .................. | F02M 45/02 123/446 |
| 7,398,763 B2 * | 7/2008 | Gibson | .................. | F02M 45/04 123/447 |
| 7,431,017 B2 * | 10/2008 | Gibson | ................ | F02M 47/027 123/446 |
| 7,614,385 B2 * | 11/2009 | Bysveen | ............. | F02D 19/0647 123/456 |
| 7,743,753 B2 * | 6/2010 | Fiveland | .................. | F02B 7/06 123/543 |
| 7,861,696 B2 * | 1/2011 | Lund | ....................... | F02B 69/02 123/525 |
| 8,220,439 B2 * | 7/2012 | Fisher | ................. | F02D 19/0647 123/304 |
| 8,333,171 B2 * | 12/2012 | Lund | ................... | F02D 19/0647 123/1 A |
| 2002/0195088 A1 | 12/2002 | Oprea | | |
| 2004/0111210 A1 * | 6/2004 | Davis | .................... | F02D 19/027 701/103 |
| 2010/0199948 A1 | 8/2010 | Rogak et al. | | |
| 2010/0332106 A1 * | 12/2010 | Vanderslice | ........ | F02D 19/0631 701/103 |

OTHER PUBLICATIONS

Written Opinion of the International Preliminary Examining Authority, dated Aug. 5, 2013; IPEA/AU.
International Preliminary Report on Patentability, dated Nov. 5, 2013; IPEA/AU.

* cited by examiner

GASEOUS METERING CONTROL FOR DUAL FLUID INJECTOR

CROSS-REFERENCE TO RELATED APPLICATIONS

This application is a 371 U.S. National Stage of International Application No. PCT/AU2012/000773, filed on Jun. 29, 2012, and claims priority to Australian Patent Application No. 2011902649, filed on Jul. 4, 2011, the disclosures of which are herein incorporated by reference in their entirety.

FIELD OF THE INVENTION

The present invention relates to injection of fuels in internal combustion engines.

More particularly, the invention is concerned with a dual fluid delivery system for delivery of fuel to an internal combustion engine.

BACKGROUND ART

The following discussion of the background art is intended to facilitate an understanding of the present invention only. The discussion is not an acknowledgement or admission that any of the material referred to is or was part of the common general knowledge as at the priority date of the application.

The invention is particularly applicable to fuel injection systems for injecting either liquid or gas. Accordingly, the invention will primarily be discussed in relation to operation of an engine on a combination of a liquid fuel and a gaseous fuel, and optionally also on either of the two fuels separately.

The liquid fuels may, for example, comprise ethanol and diesel, and the gaseous fuels may, for example, include hydrogen and CNG, as well as mixtures of CNG and hydrogen.

Fuel injection systems for injecting either liquid or gas are known.

For greater flexibility in the use of fuel, it is becoming desirable to be able to inject fluid comprising a liquid or a gas or a mixture thereof.

There have been various proposals for enabling delivery of two different fuels to an engine.

One such proposal is disclosed in WO 2010/089568 which is directed to controlling the supply of a first fuel and a second fuel to an engine which is fuelled by the first fuel only in a first mode of operation and by a mixture of the first and second fuels in a second mode of operation. The arrangement involves supplying a reduced amount of the first fuel and supplying a substitute amount of the second fuel to compensate for the reduction in the amount of the first fuel to provide a predetermined combined air to fuel ratio for each power stroke of the engine. The quantities of first and second fuels are metered separately and also delivered through separate fuel injectors; that is, the two fuels are not brought together and delivered in a common injection event through the same delivery port.

Another proposal is disclosed in EP 1 496 247 which is directed to a fuel delivery system for delivering a primary fuel such as diesel fuel to a fuel injector, and a second fuel delivery system for concurrently delivering a second fuel to the engine. The amount of the first fuel delivered to the engine is determined so that the correct amount of secondary fuel can be delivered. The secondary fuel is delivered concurrently with the first fuel but as a separate action; that is, the two fuels are not brought together and delivered in a common injection event through the same delivery port.

For certain applications, it is advantageous to effect injection of the two fuels through a common injection event; specifically, through a single injection device and via the same delivery port.

One proposal which can deliver two separate fuels in a common injection event is disclosed in US2002/0195088 which is directed to a dual fuel system for feeding a main fuel and a secondary fuel to an internal combustion engine. The dual fuel system utilises a common fuel injector connected to two separate fuel circuits, one for the main fuel and the other for the secondary fuel. Each fuel circuit has a separate fuel rail to which the common fuel injector is connected. The fuel injector has two separate fuel paths isolated from each other and each communicating with a respective fuel rail. As the fuel injector is configured to provide two separate fuel paths, the two fuels can be delivered in a common injection event. However, the two fuels are metered separately of each other and are not brought together until delivery; that is, the two fluids are not delivered in unison through the same delivery port. Accordingly, there is no requirement for metering of one fuel in the presence of the other, which would likely be required if the two fuels involve both liquid and gas components to be delivered in a common injection event through the same delivery port.

Where the two fuels are injected in a common injection event and involve both liquid and gas components, there can be a need to vary the relative proportions of the two components or compensate the amount of one due to the presence of the other.

Any variation in the quantity of gas delivered with the liquid may, however, present challenges in certain applications. The is because a variation in the quantity of one of the fuels necessitates a counterpart variation in the quantity of the other fuel. Furthermore, when a liquid fluid is injected concurrently with a gaseous fluid during the metering event for the gaseous fluid, this may change the characteristic flow rate for the gaseous fluid which is a fundamental input to the control of the metered quantity of the gaseous fluid.

Such challenges increase in circumstances where there is a requirement for an engine to run on a combination of the gaseous fuel and the liquid fuel, and optionally also to run on either of the fuels separately.

It is against this background, and the problems and difficulties associated therewith, that the present invention has been developed.

DISCLOSURE OF THE INVENTION

According to a first aspect of the invention there is provided a method for delivering a dual fluid to an internal combustion engine, the dual fluid comprising a liquid and a gas, the method comprising providing a supply of the liquid, providing a supply of a gas, determining the quantities of the liquid and the gas to be delivered in an injection event, and adjusting the injection event to compensate for the quantity of liquid to be delivered during the injection event.

With this arrangement, metered quantities for both the liquid and gas are delivered.

The injection event involves delivering the liquid and the gas, with the metering of the gas delivered being adjusted to allow for the quantity of liquid delivered with the gas.

Preferably, the liquid is delivered to the gas as a metered quantity of liquid, and the gas is delivered as a metered quantity during the injection event, with the metered quantity of gas being adjusted to allow for the quantity of liquid delivered with the gas.

Preferably, the metered quantity of gas is adjusted by adjustment of means operable to control the gas quantity.

Adjustment of the injection event to compensate for the quantity of liquid to be delivered during injection may take any appropriate form, including for example adjustment of the duration of the injection event, adjustment of the pressure of the injection event, adjustment of the quantity of fluid injected, or any combination thereof.

More particularly, in one arrangement, the duration of the injection event is adjusted to compensate for the effect of injected liquid on the flow rate during injection. In another arrangement, the pressure of the injection event is adjusted to compensate for the effect of injected liquid on the flow rate during injection. In yet another arrangement, the quantity of injected liquid is adjusted to compensate for the effect of injected liquid on the flow rate during injection.

Preferably, the quantity of gas injected is controlled by the duration of the injection event. In one case, a predicted flow rate of gas during the injection event may be adjusted based on the concurrently injected quantity of liquid. In a second case, the gaseous fluid pressure may be adjusted to maintain a target flow rate of gas when the gas is injected concurrently with a quantity of liquid.

Conveniently, the liquid is metered prior to the injection event and the gas is metered during the injection event.

Preferably, the injection event is performed using a fluid injector, with the liquid being metered to the fluid injector and the gas being metered by the fluid injector during the injection event. Preferably, the gas and liquid are delivered via the same delivery port of the fluid injector during the injection event. Preferably, the fluid injector is configured as a direct injector to deliver the liquid and/or gas directly into the combustion chamber of the engine.

Preferably, the quantity of liquid to be injected is metered into the fluid injector by a metering device.

Preferably, the quantity of liquid to be delivered and the quantity of gas to be delivered with the liquid are determined based on the engine operating conditions.

The determination of the quantity of the liquid to be delivered in the injection event may be made in any appropriate way. Typically the determination is made in accordance with the operating parameters of the engine and load demand (which in the case of a motor vehicle comprise driver demand).

Preferably, the determination of the quantity of the liquid to be delivered in the injection event is made by a control system such as an engine control unit (ECU) adapted to control operation of a fuel delivery system performing the method according to the invention.

The determination of the quantity of the gas to be delivered in the injection event may be made in any appropriate way. Typically the determination is made in accordance with the operating parameters of the engine and load demand (which in the case of a motor vehicle comprise driver demand).

Preferably, the determination of the quantity of the gas to be delivered in the injection event is made by a control system such as an engine control unit (ECU) adapted to control operation of a fuel delivery system performing the method according to the invention.

In one arrangement, the method further comprises reference to a "look-up" map or table to determine the characteristic effect of a selected quantity of fluid on the gas flow of the injector.

In another arrangement, a mathematical equation or a physical model may be used to represent the characteristic effect of a selected quantity of fluid on the gas flow of the injector.

Preferably, the determination of the corresponding metering of gaseous fluid to be delivered with the liquid fuel is made by prediction based on the quantity of liquid to be delivered. The prediction may be made by reference to a "look-up" map or table.

Typically, the ECU would refer to the "look-up" map or table to determine the required metering of gaseous fluid based on the quantity of liquid.

As mentioned above, the predicted flow rate of gaseous fluid during the injection event may be adjusted based on the concurrently injected quantity of liquid. In another case, the gaseous fluid pressure may be adjusted to maintain a target flow rate of gas when the gas is injected concurrently with a quantity of liquid.

The liquid may comprise a single liquid or a mixture of a plurality of liquids. The mixture may be blended according to the operational or performance requirements of the liquid.

The gas may comprise a single gaseous fluid or a mixture of a plurality of gaseous fluids.

The liquid may comprise a liquid fuel.

In one form the gas may comprise a gaseous fuel. The term "gaseous fuels" as used herein refers to compressed gas fuels such as compressed natural gas (CNG) and hydrogen ($H_2$), and liquefied gaseous fuels such as liquefied petroleum gas (LPG) and liquefied natural gas (LNG).

Typically, the liquid and gaseous fuels comprise hydrocarbon fuels. The hydrocarbon fuels may comprise CNG, LNG, LPG, hydrogen, gasoline, diesel, ethanol and mixtures of any one or more thereof.

In another form, the gas may comprise a gaseous fluid that is not a fuel. The gaseous fluid may comprise an inert fluid which merely contributes to the volume of dual fluid delivered (being the mixture of the liquid and the gaseous fluid). The gaseous fluid may, for example, comprise a portion of the exhaust gas from the engine available through an exhaust gas recirculation process (EGR), carbon dioxide or an inert gas. Alternatively, the gaseous fluid may comprise an active fluid within the delivered fluid mixture. The gaseous fluid may, for example, comprise an oxidant such as air.

The fluid injector may be used once or multiple times per engine cycle.

According to a second aspect of the invention there is provided a method for delivering a dual fluid to an internal combustion engine, the dual fluid comprising a liquid and a gas, the method comprising providing a supply of the liquid, providing a supply of a gas, determining the quantity of the liquid to be delivered in an injection event, determining the corresponding quantity of gas to be delivered with the liquid, and delivering the quantity of the liquid and the corresponding quantity of gas with the metering of the gas adjusted based on the quantity of liquid.

According to a third aspect of the invention there is provided a method for delivering fuel to an internal combustion engine, the method comprising providing a supply of liquid fuel, providing a supply of a gaseous fuel, determining the quantities of the liquid fuel and the gaseous to be delivered in an injection event, and adjusting the injection event to compensate for the quantity of liquid fuel to be delivered during injection.

According to a fourth aspect of the invention there is provided a method for delivering fuel to an internal combustion engine, the method comprising providing a supply of liquid fuel, providing a supply of a gaseous fuel, determining the quantity of the liquid fuel to be delivered in an injection event, and determining the corresponding quantity of gaseous fuel to be delivered with the liquid fuel, and delivering the quantity of the liquid and the corresponding quantity of gaseous fuel with the metering of the gaseous fuel adjusted based on the quantity of liquid fuel.

According to a fifth aspect of the invention there is provided a method for delivering fuel to an internal combustion engine, the method comprising providing a supply of liquid fuel, providing a supply of a gaseous fuel, determining the quantity of the liquid fuel to be delivered in a injection event, and determining the corresponding quantity of gaseous fuel to be delivered with the liquid fuel, and delivering the quantity of the liquid fuel and the corresponding quantity of gaseous fuel.

The method may further comprise the selective determination not to deliver the gaseous fuel during the injection event and to deliver only the liquid fuel (by way of an air assist delivery process). Typically, such a determination would be made for a continuous series of injection events, thereby fuelling the engine with liquid fuel only. This would be appropriate in circumstances where the engine is to be operated with liquid fuel only at any particular time.

The method may further comprise the selective determination not to deliver the liquid fuel during the injection event and to deliver only gaseous fuel. Typically, such a determination would be made for a continuous series of injection events, thereby fuelling the engine with gaseous fuel only. This would be appropriate in circumstances where the engine is to be operated with gaseous fuel only at any particular time.

According to a sixth aspect of the invention there is provided a fuel injection system for an engine, the fuel injection system delivering fuel to the engine in accordance with any one of the methods defined above.

According to a seventh aspect of the invention there is provided a fuel injection system for an engine, the fuel injection system comprising a liquid circuit and a gaseous fluid circuit communicating with a fluid delivery injector for delivering fuel to the engine, the liquid circuit comprising a fluid metering device for delivering a metered quantity of the liquid to the fuel delivery injector, and control means for determining the quantity of the liquid to be delivered in an injection event and determining the corresponding quantity of gaseous fluid to be delivered with the liquid, the control means being adapted to control operation of the fluid metering device and the fluid delivery injector to control the quantity of the liquid and the corresponding quantity of gaseous fluid delivered.

Preferably, the control means is operable to adjust the injection event to compensate for the quantity of liquid to be delivered during the injection event.

Preferably, the control means being adapted to control operation of the fluid metering device and the fluid delivery injector to deliver the quantity of the liquid and the corresponding quantity of gaseous fluid with the metering of the gaseous fluid adjusted based on the quantity of liquid.

The fluid delivery injector may be configured for either direct injection, or indirect injection such as port fuel injection or multipoint fuel injection.

The fluid metering device may comprise a fluid metering injector.

Preferably, the control means comprises as an electronic control unit (ECU). The ECU controls operation of the fuel delivery, injector and the fluid metering device.

According to an eighth aspect of the invention there is provided a fuel injection system for an engine, the fuel injection system comprising a liquid fuel circuit and a gaseous fuel circuit communicating with a fluid delivery injector for delivering fuel to the engine, the liquid fuel circuit comprising a fluid metering device for delivering a metered quantity of the liquid fuel to the fuel delivery injector, and control means for determining the quantity of the liquid fuel to be delivered in an injection event and determining the corresponding quantity of gaseous fuel to be delivered with the liquid fuel, the control means being adapted to control operation of the fluid metering device and the fluid delivery injector to control the quantity of the liquid fuel and the corresponding quantity of gaseous fuel delivered based on the quantity of liquid fuel.

Preferably, the control means is operable to adjust the injection event to compensate for the quantity of liquid fuel to be delivered during the injection event.

Preferably, the control means is adapted to control operation of the fluid metering device and the fluid delivery injector to deliver the quantity of the liquid fuel and the corresponding quantity of gaseous fuel with the metering of the gaseous fuel adjusted based on the quantity of liquid fuel.

According to a ninth aspect of the invention there is provided an internal combustion engine adapted to be fuelled using a method according to the invention as defined hereinbefore.

According to a tenth aspect of the invention there is provided an internal combustion engine fitted with a fuel injection system according to the invention as defined hereinbefore.

BRIEF DESCRIPTION OF THE DRAWINGS

The invention will be better understood by reference to the following description of several specific embodiments as shown in the accompanying drawings in which.

BEST MODE(S) FOR CARRYING OUT THE INVENTION

The first embodiment, which is shown in FIGS. 1 to 4, is directed to a fuel injection system 10 for delivering metered amounts fuel into the combustion chamber or cylinder of an engine. The fuel delivered can selectively comprise a gaseous fuel, a liquid fuel or a fuel mixture comprising the gaseous fuel and the liquid fuel.

When the fuel delivered into the combustion chamber comprises a mixture of the gaseous fuel and the liquid fuel, the quantity of liquid fuel comprises a metered quantity, and the quantity of gaseous fuel comprises a metered quantity. The metering of the gaseous fuel is regulated by prediction, as will be described in more detail later.

The injection system 10 comprises a liquid fuel circuit 11 and a gaseous fuel circuit 13, both communicating with a fuel delivery injector 15 that delivers fuel to the combustion chamber or cylinder of the engine. The fuel delivery injector 15 may be configured for either direct injection or indirect injection such as port fuel injection or multipoint fuel injection.

Figure 4:
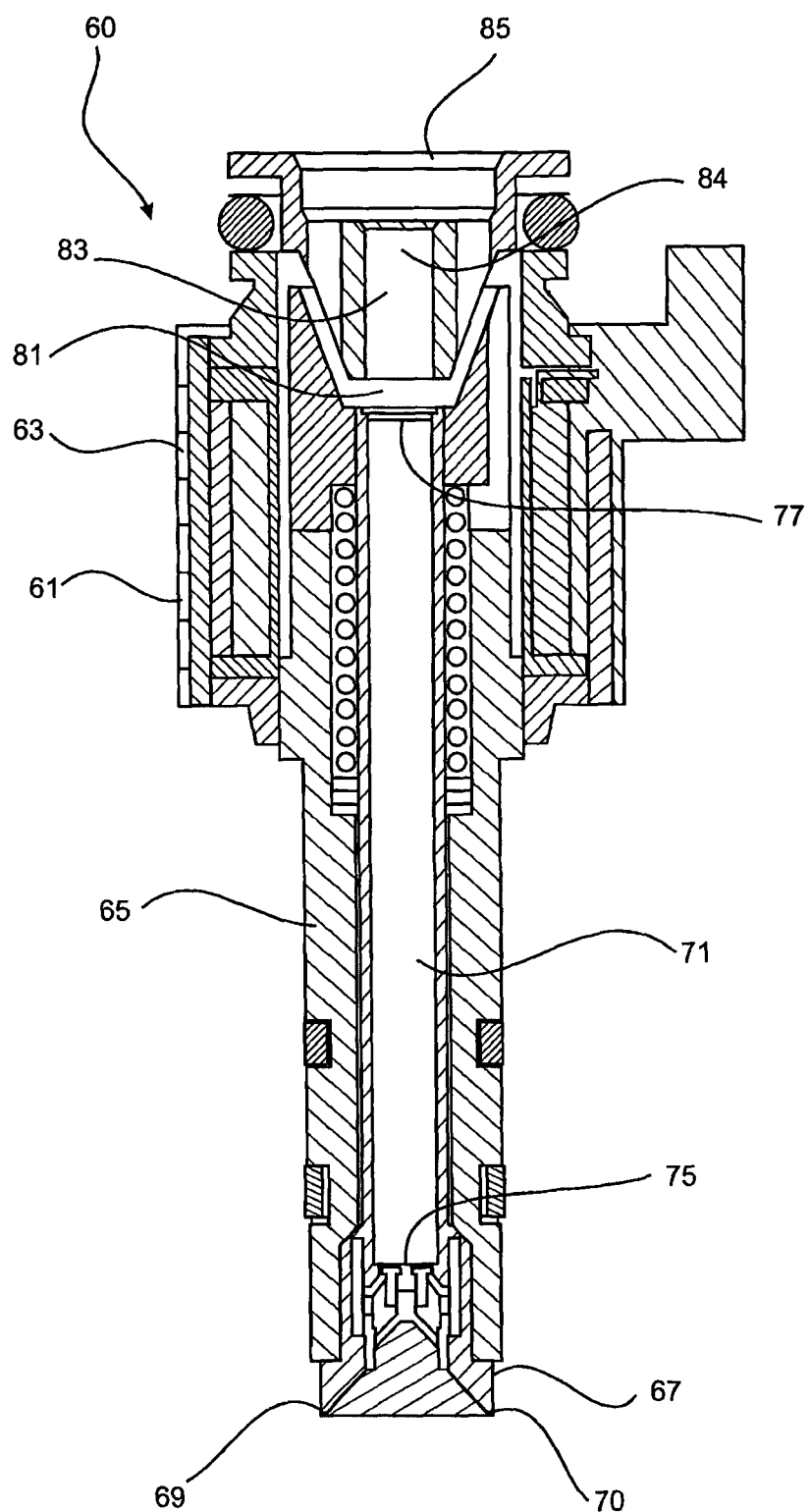
FIG. 4 is a sectional view of a fluid injector used in the injection system according to the first embodiment.

The fuel delivery injector 15 can use gaseous fuel as a propellant for injecting liquid fuel held in a holding chamber of the fuel delivery injector. A suitable fluid delivery injector assembly suitable for use as the fuel delivery injector 15 is shown in FIG. 4 and will be described later.

The liquid fuel circuit 11 comprises a liquid fuel supply comprising a fuel tank 21, a liquid fuel pump 23, a fuel filter 25, a pressure transducer 27 and a differential pressure regulator 29. The liquid fuel circuit 11 also comprises a fluid metering injector 31 for delivering a metered quantity of the liquid fuel to the fuel delivery injector 15. More particularly, the fluid metering injector 31 is arranged to deliver a metered quantity of the liquid fuel into the holding chamber of the fuel delivery injector 15. In the arrangement shown, the liquid fuel circuit 11 also incorporates a fuel return path 33.

The gaseous fuel circuit 13 comprises a gaseous fuel supply comprising a fuel tank 41, a pressure regulator 43 to regulate the supply pressure of the gaseous fuel, a filter 45, and a pressure and temperature transducer 49.

The fuel injection system 10 further comprises an electronic control unit (ECU), which is not shown, for controlling operation of the fuel injection system. In particular, the ECU controls operation of the fuel delivery injector 15 and the fluid metering injector 31.

The ECU can control the operating parameters of the fuel delivery injector 15, particularly the duration of the opening of the injector 15, as well as the points in the engine operating cycle at which the injector 15 is opened and closed.

The ECU receives input signals from various sensors providing information relating to the operating conditions of the engine and driver demands. The ECU outputs various control signals, including in particular control signals relating to operation of the fuel delivery injector 15 and the fluid metering injector 31.

The ECU is able to vary the operating parameters of the fluid metering injector 31 in order to meter the required quantity of liquid fuel into the holding chamber of the fuel delivery injector 15.

The ECU is also able to vary the operating parameters of the fuel delivery injector 15 in order to meter the required quantity of injected gaseous fuel.

The ECU determines the fuelling requirements for the engine based upon the input signals from the various sensors providing information relating to the operating conditions of the engine and driver demands. Specifically, the ECU determines the proportions of liquid fuel and gaseous fuel required to meet the fuelling demand. The ECU operates the fluid metering injector 31 to deliver the required quantity of liquid fuel into the holding chamber of the fuel delivery injector 15. The ECU also predicts the gaseous fuel flow required to deliver the necessary proportion of gaseous fuel and operates the fuel delivery injector 15 accordingly.

In particular, the ECU refers to a "look-up" map or table to determine the operating parameters of the fuel delivery injector 15 to deliver the necessary quantity of gaseous fuel. Specifically, the ECU operates the fuel delivery injector 15 for the duration necessary to deliver the predicted gaseous fuel flow.

The inputs to the "look-up" map or table may comprise factors such as liquid fuel flow, engine speed, and gaseous fuel pressure and temperature as determined by the pressure and temperature transducer 49. The "look-up" map or table is developed having regard to the characteristics of the fuel delivery injector 15.

There may also be provision for mapping with a closed loop system, with feedback being provide from one or more sensors, such as for example an oxygen sensor.

Figure 1:
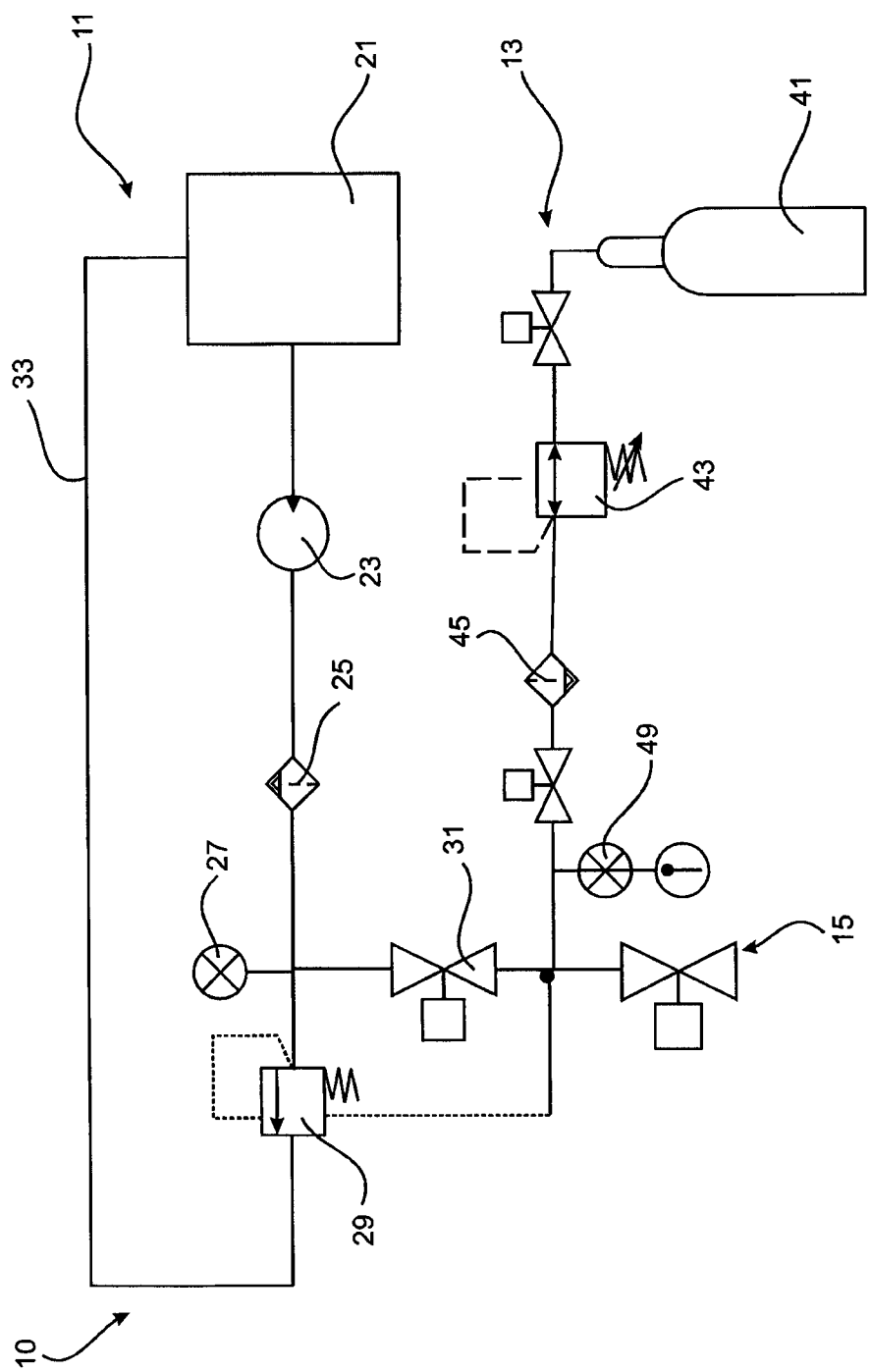
FIG. 1 is a schematic view of an injection system according to a first embodiment.
Figure 2:
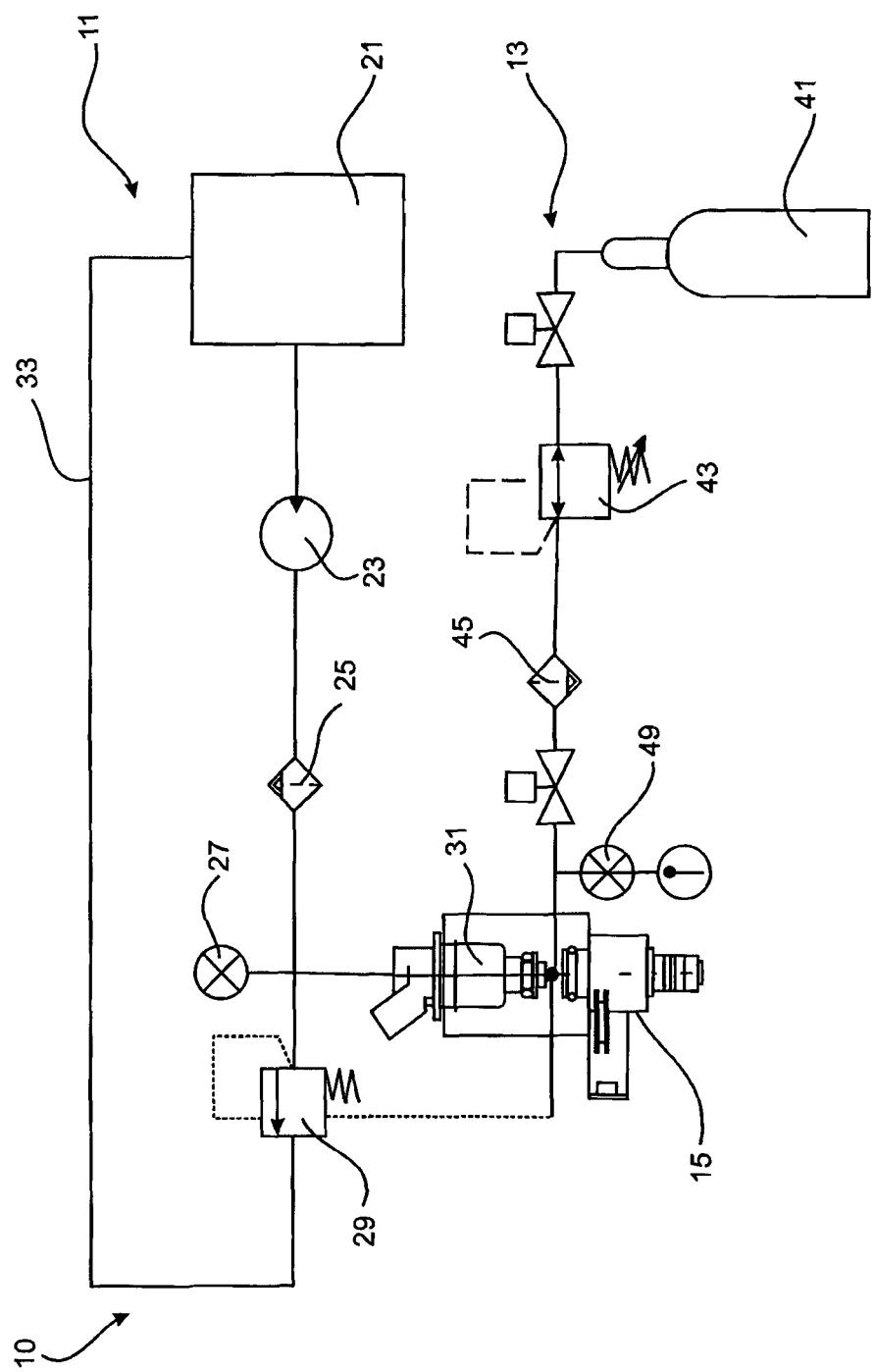
FIG. 2 is a further schematic view of the injection system according to the first embodiment.
Figure 3:
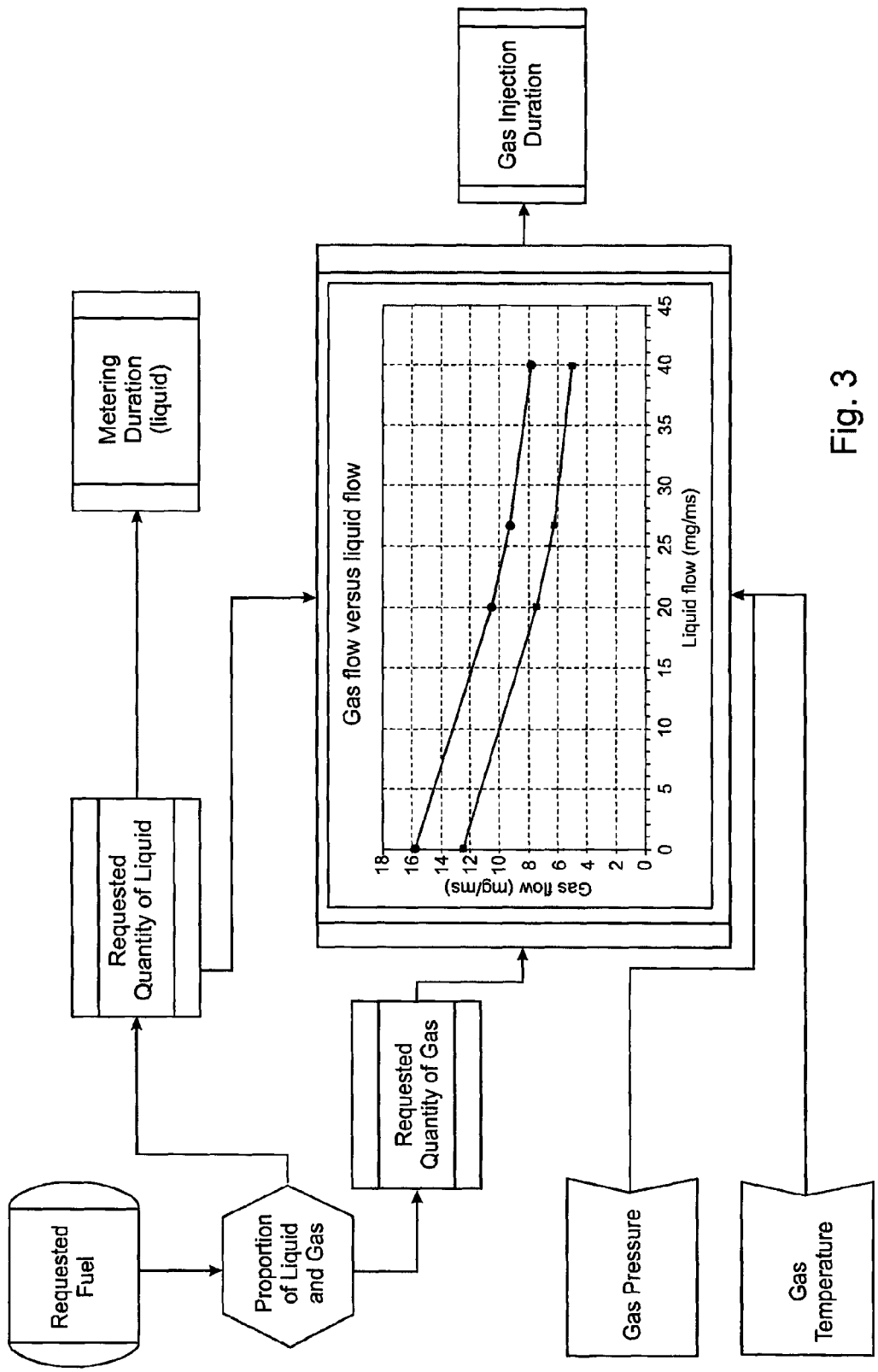
FIG. 3 is a schematic view depicting operation of the fuel injection system according to the first embodiment.

The operation of the fuel injection system 10 according to the first embodiment is depicted schematically in FIG. 3.

The fuel injection system 10 can be operated selectively to deliver gaseous fuel only, liquid fuel only (by way of an air assist delivery process), or a fuel mixture comprising the gaseous fuel and the liquid fuel.

Referring now to FIG. 4, there is shown a fluid delivery injector assembly 60 suitable for use as the fuel delivery injector 15.

The fluid delivery assembly 60 comprises a body 61 having a body portion 63 and a tip portion 65 terminating at an end 67 incorporating a valve 69 operable to deliver a metered quantity of fluid through a corresponding delivery port 70. The body 61 incorporates a central passage 71 for conveying the fluid to the end 67. The central passage 71 has a distal end 75 communicating with the valve 69 and a proximal end 77 for receiving a metered quantity of liquid fuel and an unmetered flow of gaseous fluid.

The proximal end 77 of passage 71 communicates with a space 81 within the body portion 63.

The passage 71, space 81 and a volume 83 together define a holding chamber 84 for the delivery assembly 60 into which a metered quantity of the liquid fuel can be delivered. The body portion 63 also incorporates a head portion 85 configured to receive the liquid injector 31 (which is not shown in FIG. 4) operable to selectively deliver liquid fuel in metered quantities into the holding chamber 84.

The body 61 is also configured to receive the gaseous fluid under pressure. The gaseous fluid is delivered into the delivery assembly 60 via the volume 83 in an unmetered condition.

The gaseous fluid, when flowing through the delivery assembly 60 and the holding chamber 84 thereof conveys the resultant fluid mixture for injection through the end 67 of the tip portion 65, with the valve 69 metering the quantity of fluid mixture injected through the corresponding delivery port 70. As the fluid mixture flows through the delivery port the liquid in the mixture is atomised.

With this arrangement, metering of the liquid fuel and metering of the gaseous fluid are performed separately. In the arrangement illustrated, the liquid fuel is metered by the liquid injector 31 (not shown in FIG. 4) which is positioned on the head portion 85 and which is operable to deliver liquid fuel in metered quantities into the holding chamber 84 of the delivery assembly 60. Further, the gaseous fluid is metered through operation of the valve 69, with the metering function being controlled by the opening regime of the valve (including in particular the timing of opening). Furthermore, the amount of fluid delivered may be a function of the pressure within the system and the characteristics of the mass flow rate of the fluid.

As mentioned previously, the gaseous fluid may comprise gaseous fuel or air (or indeed some other gas), depending upon the fuelling requirement of the engine. In a fuelling requirement involving liquid fuel only, the gaseous fluid may, for example, comprise air in order to provide an air assist delivery process. In other scenarios the gaseous fluid may alternatively be EGR or an inert gas. In a fuelling requirement for a compression ignition engine configured for dual fuel operation with a gaseous fuel and a liquid fuel as a pilot fuel for compression ignition, the gaseous fluid would comprise the gaseous fuel whilst the liquid fuel may be diesel. With such an arrangement, the gaseous fuel would also serve to transport the liquid fuel from the holding chamber 84 of the delivery assembly 60 for injection through the end 67 of the tip portion 65 (in a similar manner to air in an air assist delivery process).

Figure 5:
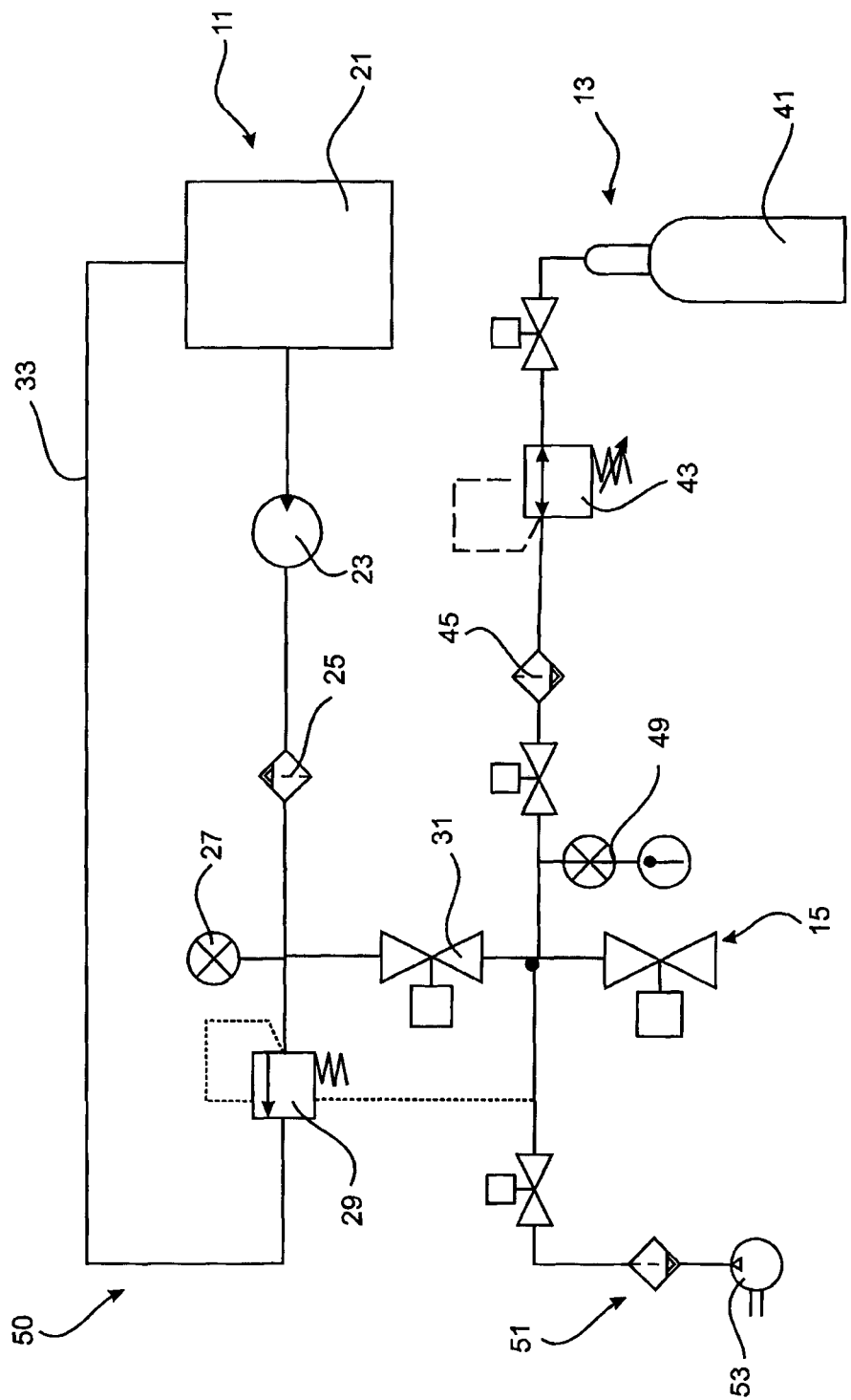
FIG. 5 is a schematic view of an injection system according to a second embodiment.
Figure 6:
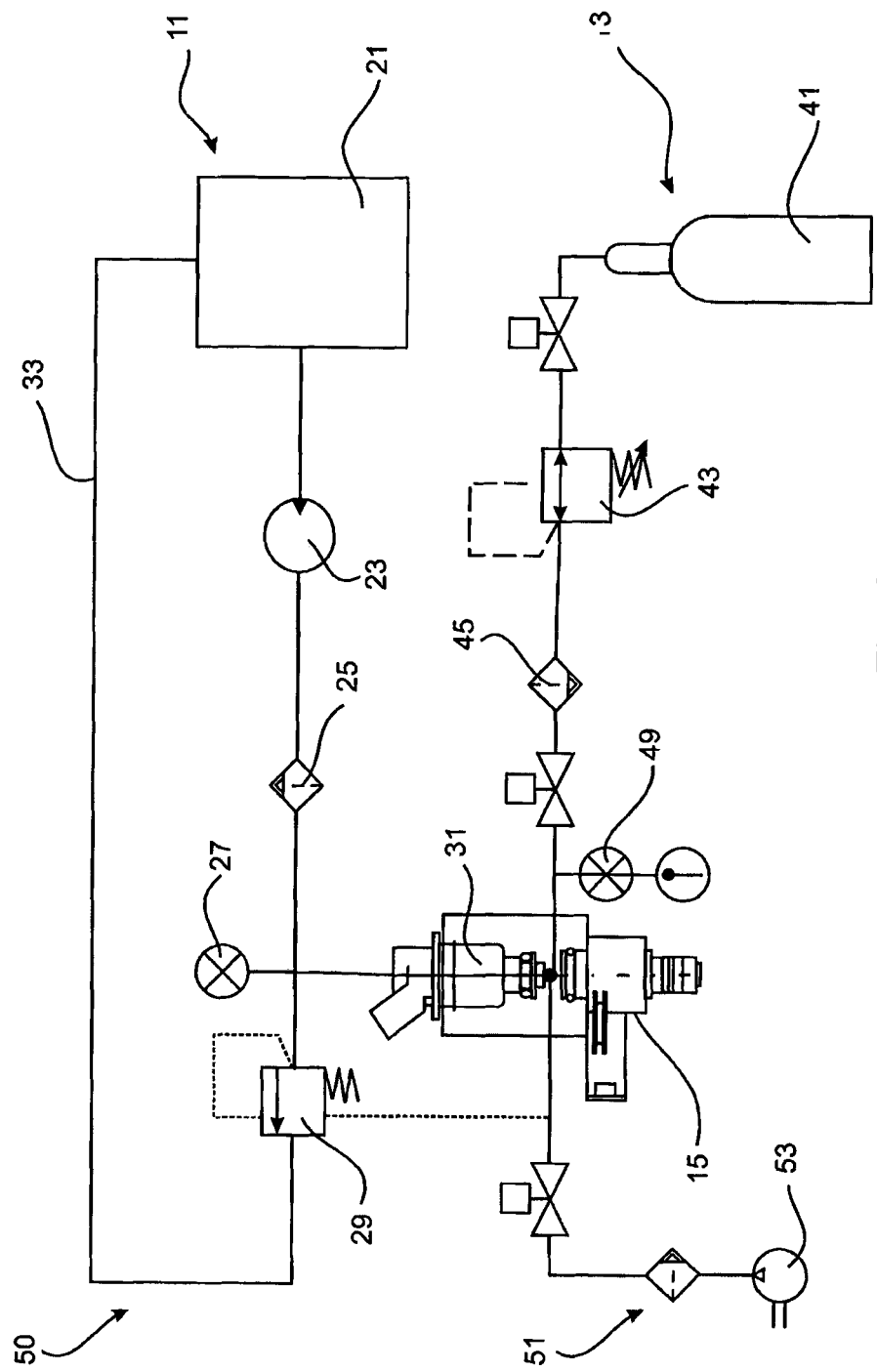
FIG. 6 is a further schematic view of then injection system according to the second embodiment.

Referring now to FIGS. 5 and 6 there is shown a fuel injection system 50 according to a second embodiment. The fuel injection system 50 is similar in many respects to the fuel injection system 10 according to the first embodiment and so corresponding reference numerals are used to identify corresponding parts. As was the case with the first embodiment, the fuel injection system 50 can be operated to deliver gaseous fuel only, liquid fuel only (by way of an air assist delivery process), or a fuel mixture comprising the gaseous fuel and the liquid fuel. Additionally, the fuel injection system 50 can be operated to selectively deliver the liquid fuel by an air-assist fuel delivery process. Further the fuel mixture comprising the gaseous fuel and the liquid fuel may also selectively additionally comprise air.

Accordingly, in addition to the liquid fuel circuit 11 the gaseous fuel circuit 13, and the fuel delivery injector 15, the fuel injection system 50 has a compressed air circuit 51 for supplying compressed air to the fuel delivery injector 15. The compressed air circuit 51 comprises an air compressor 53.

The compressed air can function as a propellant for injecting liquid fuel held in the holding chamber 84 of the fuel delivery injector 15 into the combustion chamber. This provides an air-assist fuel delivery process. The differential pressure regulator 29 in the liquid fuel circuit 11 regulates the pressure of the compressed air and liquid fuel supplied such that the pressure of the liquid fuel is at a predetermined level above the pressure of the compressed air so that the liquid fuel can be metered against the pressure of the compressed air.

The fuel injection system 50 can also be operated to provide an air-gaseous fuel mixture in conjunction with the liquid fuel.

The fuel injection systems 10, 50 according to the embodiments can be operated with liquid fuels and gaseous fuels of any appropriate type.

The gaseous fuels may, for example, include hydrogen and CNG, as well as mixtures of CNG and hydrogen.

The liquid fuels may, for example, include ethanol and diesel.

Fuelling by way of a fuel mixture can provide advantages in certain applications, including better ignitability and better combustion.

A particularly useful fuel mixture may comprise diesel and CNG, with the diesel component delivering compression ignition. It is believed that a fuel mixture of up to about 95% CNG and 5% diesel would still achieve compression ignition (depending on engine load).

The fuel injection systems 10, 50 may be operated to switch from delivery of one fuel to another.

The fuel injection systems according to the embodiments can be used with engines operating under two-stroke and four-stroke cycles. Additionally, they can be used with spark-ignition and compression-ignition engines.

In other embodiments, the liquid fuel circuit 11 may be replaced by a liquid circuit adapted to deliver a liquid other than a fuel. The liquid may, for example, comprise water. Water may be delivered into the combustion chamber for various reasons, including for knock suppression, control of cylinder pressure and combustion control.

In still other embodiments, gaseous fluids other than gaseous fuels may be delivered into the combustion chamber. The gaseous fluids may comprise an inactive fluid which merely contributes to the volume of dual fluid delivered (being the mixture of the liquid and the gaseous fluid). The gaseous fluid may, for example, comprise a portion of the exhaust gas from the engine available through an exhaust gas recirculation process (EGR), carbon dioxide or an inert gas. Alternatively, the gaseous fluid may comprise an active fluid within the delivered fluid mixture. The gaseous fluid may, for example, comprise an oxidant such as air.

It should be appreciated that the scope of the invention is not limited to the scope of the embodiments described.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claims defining the invention is as follows:

1. A method for delivering a dual fluid to an internal combustion engine, the dual fluid comprising a liquid and a gas, the method comprising providing a supply of the liquid, providing a supply of the gas, determining a metered quantity of the liquid and a quantity of the gas to be delivered with the liquid in an injection event in which the liquid and gas are delivered through a delivery injector, and managing the delivery of the gas based on the effect of the quantity of the liquid on the flow rate of the gas through the delivery injector.

2. The method according to claim 1 wherein the liquid is delivered to the delivery injector as a metered quantity of the liquid, with the quantity of the gas being adjusted by the delivery injector to allow for the metered quantity of the liquid delivered with the gas through the delivery injector.

3. The method according to claim 1, wherein managing the delivery of the gas comprises adjusting the duration of the injection event.

4. The method according to claim 1 wherein managing the delivery of the gas comprises adjusting the pressure of the injection event.

5. The method according to claim 1 wherein managing the delivery of the gas comprises adjusting the quantity of fluid delivered.

6. The method according to claim 1 wherein managing the delivery of the gas comprises adjusting the duration of the injection event, adjusting the pressure of the injection event, adjusting the quantity of fluid delivered, or any combination thereof.

7. The method according to claim 1 wherein the quantity of gas delivered is controlled by the duration of the injection event.

8. The method according to claim 1 wherein the liquid is metered prior to the injection event and the gas is metered during the injection event.

9. The method according to claim 8 wherein the liquid is metered to the delivery injector and the gas is metered by the delivery injector during the injection event.

10. The method according to claim 1 further comprising reference to a "look-up" map or table to determine the quantity of the gas to be delivered with the liquid.

11. The method according to claim 1 further comprising use of a mathematical equation or a physical model to determine the quantity of the gas to be delivered with the liquid.

12. The method according to claim 1 wherein the determination of the quantity of gas to be delivered with the liquid is made by prediction based on the quantity of liquid to be delivered, the predication providing a predicted flow rate.

13. The method according to claim 12 wherein the prediction is made by reference to a "look-up" map or table.

14. The method according to claim 12 wherein the predicted flow rate of gas during the injection event is adjusted based on the concurrently delivered quantity of liquid.

15. The method according to claim 1 wherein the fluid pressure of the gas is adjusted to maintain a target flow rate of gas when the gas is delivered concurrently with the quantity of liquid.

16. A method for delivering fuel to an internal combustion engine, the method comprising providing a supply of liquid fuel, providing a supply of a gaseous fuel, determining a metered quantity of the liquid fuel and a quantity of the gaseous fuel to be delivered with the liquid fuel in an injection event in which the liquid fuel and gaseous fuel are delivered through a delivery injector, and managing the delivery of the gaseous fuel based on the effect of the quantity of the liquid fuel on the flow rate of the gaseous fuel during the injection event.

17. A method for delivering fuel to an internal combustion engine, the method comprising providing a supply of liquid fuel, providing a supply of a gaseous fuel, determining a metered quantity of the liquid fuel and a quantity of the gaseous fuel to be delivered with the liquid fuel in an injection event, and delivering the quantity of the liquid fuel and the quantity of gaseous fuel through a common delivery port during the injection event with the metering of the gaseous fuel adjusted based on the quantity of liquid fuel, wherein the gaseous fuel is metered during the injection event and wherein the delivery of the gaseous fuel is managed based on the effect of the quantity of liquid fuel on the flow rate of the gaseous fuel during the injection event.

18. The method according to claim 17 further comprising the selective determination not to deliver the gaseous fuel during the injection event and to deliver only the liquid fuel.

19. The method according to claim 18 wherein the delivery of liquid fuel only comprises delivery by way of an air assist delivery process.

20. The method according to claim 17 further comprising the selective determination not to deliver the liquid fuel during the injection event and to deliver only the gaseous fuel.

21. A fuel injection system for an engine, the fuel injection system comprising a liquid circuit and a gaseous fluid circuit communicating with a fluid delivery injector for delivering fuel to the engine, the liquid circuit comprising a fluid metering device for delivering a metered quantity of the liquid to the fuel delivery injector, and control means for determining the metered quantity of the liquid and a quantity of gaseous fluid to be delivered with the liquid in an injection event, the control means being adapted to control operation of the fluid metering device and the fluid delivery injector to control the quantity of the liquid and the quantity of gaseous fluid delivered, wherein the control means is operable to manage the delivery of the gaseous fluid based on the effect of the quantity of the liquid on the flow rate of the gaseous fluid through the fluid delivery injector.

22. The fuel injection system according to claim 21 wherein the control means is operable to adjust the injection event to compensate for the quantity of liquid to be delivered during the injection event.

23. The fuel injection system according to claim 21 wherein the control means is adapted to control operation of the fluid metering device and the fluid delivery injector to deliver the quantity of the liquid and the quantity of gaseous fluid with the metering of the gaseous fluid adjusted based on the quantity of liquid.

24. A fuel injection system for an engine, the fuel injection system comprising a liquid fuel circuit and a gaseous fuel circuit communicating with a fluid delivery injector for delivering fuel to a combustion chamber of the engine, the liquid fuel circuit comprising a fluid metering device for delivering a metered quantity of the liquid fuel to the fuel delivery injector, and control means for determining the metered quantity of the liquid fuel and a quantity of gaseous fuel to be delivered with the liquid fuel to the combustion chamber in an injection event, the control means being adapted to control operation of the fluid metering device and the fluid delivery injector to control the quantity of the liquid fuel and the quantity of gaseous fuel delivered to the combustion chamber, wherein the gaseous fuel is metered by the fluid delivery injector during the injection event and wherein the control means is operable to manage the delivery of the gaseous fuel based on the effect of the quantity of the liquid fuel on the flow rate of the gaseous fuel through the fluid delivery injector.

25. A fuel injection system for an engine, the fuel injection system comprising a liquid circuit and a gaseous fluid circuit communicating with a fluid delivery injector for delivering fuel to the engine, the liquid circuit comprising a fluid metering device for delivering a metered quantity of the liquid to the fuel delivery injector, and a control means for determining the metered quantity of the liquid and a quantity of gaseous fluid to be delivered with the liquid, wherein the control means is operable to manage the delivery of the gaseous fluid based on the effect of the quantity of the liquid on the flow rate of the gaseous fluid through the delivery injector.

26. The fuel injection system according to claim 25 wherein the control means is operable to adjust the injection event to compensate for the quantity of liquid to be delivered during the injection event and wherein the gaseous fluid is metered by the delivery injector during the injection event.

27. A fuel injection system for an engine, the fuel injection system comprising a liquid circuit and a gaseous fluid circuit communicating with a fluid delivery injector for delivering fuel to the engine, the liquid circuit comprising a fluid metering device for delivering a metered quantity of the liquid to the fuel delivery injector, the gaseous fluid circuit comprising a pressure regulator, and a control means for determining the metered quantity of the liquid and a quantity of gaseous fluid to be delivered with the liquid, wherein the control means is operable to manage the delivery of the gaseous fluid based on the effect of the quantity of the liquid on the flow rate of the gaseous fluid through the fluid delivery injector, wherein the control means is operable to control a duration of the delivery of the fuel to the engine by the fuel delivery injector, a pressure of the gaseous fluid to the fuel delivery injector, a quantity of gaseous fluid delivered by the delivery injector, or any combination thereof.

* * * * *